US005407088A

United States Patent [19]
Jorgensen et al.

[11] Patent Number: 5,407,088
[45] Date of Patent: * Apr. 18, 1995

[54] PLASTIC BOX ASSEMBLY FOR CEILING FIXTURE SUPPORT

[75] Inventors: Robert W. Jorgensen, Niles, Mich.; William E. Slater, South Bend, Ind.

[73] Assignee: Incorporated Hubbell, Orange, Conn.

[*] Notice: The portion of the term of this patent subsequent to Aug. 10, 2010 has been disclaimed.

[21] Appl. No.: 59,965

[22] Filed: May 13, 1993

Related U.S. Application Data

[63] Continuation-in-part of Ser. No. 696,258, Apr. 30, 1991, Pat. No. 5,234,119, which is a continuation of Ser. No. 624,470, Dec. 10, 1990, abandoned, and a continuation of Ser. No. 545,575, Jun. 29, 1990, abandoned.

[51] Int. Cl.[6] .............................................. H02G 3/08
[52] U.S. Cl. ...................................... 220/3.9; 248/343
[58] Field of Search ....................... 220/3.2, 3.3, 3.9; 248/342, 343

[56] References Cited

U.S. PATENT DOCUMENTS

| | | | |
|---|---|---|---|
| 1,143,775 | 6/1915 | Oppen | 248/343 |
| 1,155,805 | 10/1915 | Guth | 248/343 |
| 1,748,693 | 2/1930 | Adell | . |
| 1,800,484 | 4/1931 | Thomas, Jr. | . |
| 1,901,235 | 3/1933 | Glowacki | 248/343 |
| 1,966,451 | 7/1934 | Le Manquais | . |
| 2,990,153 | 6/1961 | Wolar | 248/343 |
| 3,701,448 | 10/1972 | Vadnais | . |
| 4,135,337 | 1/1979 | Medlin | . |
| 4,684,092 | 8/1987 | Reiker | . |
| 4,747,506 | 5/1988 | Stuchlik, III | . |
| 4,843,189 | 6/1989 | Jorgensen et al. | . |
| 4,874,905 | 10/1989 | Schnell et al. | . |
| 4,880,128 | 11/1989 | Jorgensen | . |
| 4,909,405 | 3/1990 | Kerr, Jr. | . |
| 5,025,994 | 6/1991 | Rodick | . |
| 5,234,119 | 2/1993 | Jorgensen et al. | 220/3.9 |

Primary Examiner—Steven M. Pollard
Attorney, Agent, or Firm—Jerry M. Presson; David L. Tarnoff

[57] ABSTRACT

A plastic ceiling box assembly adapted to support a ceiling fan thereon and adapted to be mounted on a structural member, such as a ceiling joist. The ceiling box comprises a body member having a lower wall and a pair of side walls defining a recess for snugly receiving the ceiling joist therein. Box mounting holes for receiving box mounting fasteners are located at opposite sides and ends of the lower wall for attaching the ceiling box to the joist. Openings for receiving fan supporting fasteners are formed in the body member adjacent the box mounting holes. Brackets at opposite ends of the body member aid in attaching the body member to the joist. This overall arrangement provides sufficient support and strength to resist dynamic loads of a ceiling fan weighing up to 35 pounds even though the ceiling box is formed of plastic. The plastic ceiling box assembly could be provided with a substantially U-shaped metal bracket for supporting ceiling fans weighing over 35 pounds. The U-shaped bracket is attached directly to the joist by a pair of screws extending through the lower wall of the ceiling box.

14 Claims, 6 Drawing Sheets

PLASTIC BOX ASSEMBLY FOR CEILING FIXTURE SUPPORT

RELATED PATENT APPLICATIONS

This application is a continuation-in-part of U.S. patent application Ser. No. 07/696,258, filed on Apr. 30, 1991, now U.S. Pat. No. 5,234,119 in the names of Robert W. Jorgensen and William E. Slater, entitled PLASTIC BOX FOR CEILING FAN SUPPORT, which is a continuation of U.S. patent application Ser. No. 07/624,470, filed on Dec. 10, 1990, now abandoned and a continuation of U.S. patent application Ser. No. 07/545,575, filed on Jun. 29, 1990, now abandoned.

FIELD OF THE INVENTION

This invention relates to a ceiling box assembly for directly mounting a ceiling fan or fixture thereto and in which either the ceiling box is the sole support for the ceiling fan, or a bracket couples the ceiling fan and the ceiling box to a structural member of a building. More specifically, the invention relates to a plastic ceiling box specifically constructed to straddle a structural member of a building and to withstand the dynamic loads imposed by a ceiling fan, especially the flexing caused by an unbalanced ceiling fan.

BACKGROUND OF THE INVENTION

Ceiling fans have become increasingly popular in today's homes and businesses. Ceiling fans are typically mounted to either a ceiling box or a ceiling pan. Ceiling boxes and ceiling pans are essentially identical, except that ceiling boxes are about 1½ to 2⅛ inches in depth and mounted to the side of a truss, joist or rafter, while ceiling pans are about ½ inch in depth and mounted to the bottom of a truss, joist or rafter. Thus, ceiling boxes are typically used in new work or construction, while ceiling pans are used in old work and new work applications. In old work applications, the ceiling pan eliminates the need to crawl in the attic for mounting it to the Joist, which is necessary when using a ceiling box in old work applications.

In the past, ceiling boxes or pans were tested under static loads only. With the increasing popularity of ceiling fans came the concern that the dynamic loads of an unbalanced ceiling fan could cause the ceiling box or pan to flex and break. This concern led to a new 1987 N.E.C. code provision (N.E.C. 370-17C) that required ceiling boxes or pans intended to be used as the sole support of ceiling fans to be tested and listed for that use. Underwriter's Laboratories (U.L.) responded with a new test that ceiling boxes or pans are required to pass.

A plastic ceiling box or pan that withstands the dynamic flexing of an unbalanced ceiling fan and resists torque loads is not known in the prior art. However, because plastic electrical boxes are relatively inexpensive and easy to manufacture, it would be desirable to use plastic ceiling boxes for fan support.

U.S. Pat. No. 3,701,448 to Vadnais discloses a metallic electric junction box having an indentation on one side so that the box can be fit over a corrugation or ridge in a roofing panel. The Vadnais patent does not disclose a plastic ceiling box which resists the dynamic flexing produced by an unbalanced ceiling fan.

Examples of other electrical outlet boxes known in the art are disclosed in the following U.S. Pat. Nos. 1,800,484 to Thomas; 1,748,693 to Addell; 1,966,451 to Manquais; 4,135,337 to Medlin; 4,684,092 to Reiker; 4,747,506 to Stuchlik, III; 4,843,189 to Jorgensen et al; 4,880,128 to Jorgensen; and 4,909,405 to Kerr, Jr. None of these patents are directed to special problems of flexing and breaking associated with plastic ceiling fan boxes required to withstand torque loads from fan blades or other dynamic motions.

This invention addresses these problems in the art, along with other needs which will become apparent to those skilled in the art once given this disclosure.

SUMMARY OF THE INVENTION

Accordingly, a primary object of the present invention is to provide a ceiling box that resists the fatigue resulting from dynamic loads generated by a ceiling fan.

A further object of the invention is to provide a plastic ceiling box that adequately meets the test standards for plastic ceiling boxes used as the sole support for a ceiling fan.

Yet another object of the invention is to provide an integrally molded plastic ceiling box that can be used as the sole support for ceiling fans under 35 pounds, and in conjunction with a bracket for supporting ceiling fans over 35 pounds.

A further object of the invention is to provide an integrally molded plastic ceiling box that can be used in old work applications, i.e., an existing opening of a ceiling pan or in new construction for installing a ceiling fan.

Another object is to provide a ceiling box that has a large contact area for intimately contacting both sides and bottom of a structural member to resist torque loads placed on the box.

The foregoing objects are basically attained by providing a plastic ceiling box adapted to support a ceiling fan thereon and adapted to be mounted on a structural member, the combination comprising: a substantially planar lower wall; a first and second substantially planar opposed side walls coupled to and substantially perpendicular to the lower wall for defining a recess sized to snugly receive a structural member therein; an outer wall structure coupled to the first and second side walls and the lower wall for defining a substantially U-shaped inner cavity with a continuous bottom edge defining an open bottom; a first bracket being coupled to the outer wall structure to form a first substantially planar surface with the first side wall for contacting one side of the structural member; a second bracket being coupled to the outer wall structure to form a second substantially planar surface with the second side wall for contacting the other side of the structural member; and a fastening member coupled to the outer wall structure at its bottom edge for coupling the ceiling fan thereto.

The foregoing objects are also basically attained by a ceiling box assembly adapted to support a ceiling fan thereon and adapted to be mounted on a structural member, the combination comprising: a body member having a substantially planar lower wall, a first substantially planar side wall extending substantially perpendicular to the lower wall, and a second substantially planar side wall extending substantially perpendicular to the lower wall for defining a recess for receiving the structural member therein, the body member being integrally formed of substantially rigid plastic; a substantially U-shaped metal bracket with a bight portion, a first leg portion extending from one end of the bight portion, and a second leg portion extending from the other end of the bight portion, each of the first and second leg portions having mounting holes for receiving first and second box mounting fasteners, respectively; a first fastening hole formed in the lower wall for receiving the first box mounting fastener to couple the lower wall to the structural member; a second fastening hole formed in said lower wall for receiving the second box mounting fastener to couple the lower wall to the structural member, the first and second fastening holes being located at opposite ends of the lower wall; a third fastening hole formed in the body member for receiving a first fan support fastener to couple a ceiling fixture to the body member; and a fourth fastening hole formed in the body member for receiving a second fan supporting fastener to couple a ceiling fixture to the body member.

The ceiling boxes of the present invention straddles the structural member or ceiling joist with a large contact area snugly or intimately contacting the ceiling joist to allow the ceiling box to withstand the torque loads placed on the box by a ceiling fan. Having the box mounting portions located at opposite sides and ends of the lower wall and having the an supporting portions located adjacent to the box mounting portions maximizes support and strength to resist the dynamic loads imposed by a ceiling fan.

Other objects, advantages and salient features of the invention will become apparent from the following detailed description, which, taken in conjunction with the annexed drawings, discloses preferred embodiments of the invention.

DETAILED DESCRIPTION OF THE DRAWINGS

Referring now to the drawings which form part of this original disclosure:

DETAILED DESCRIPTION OF THE INVENTION

Figure 1:
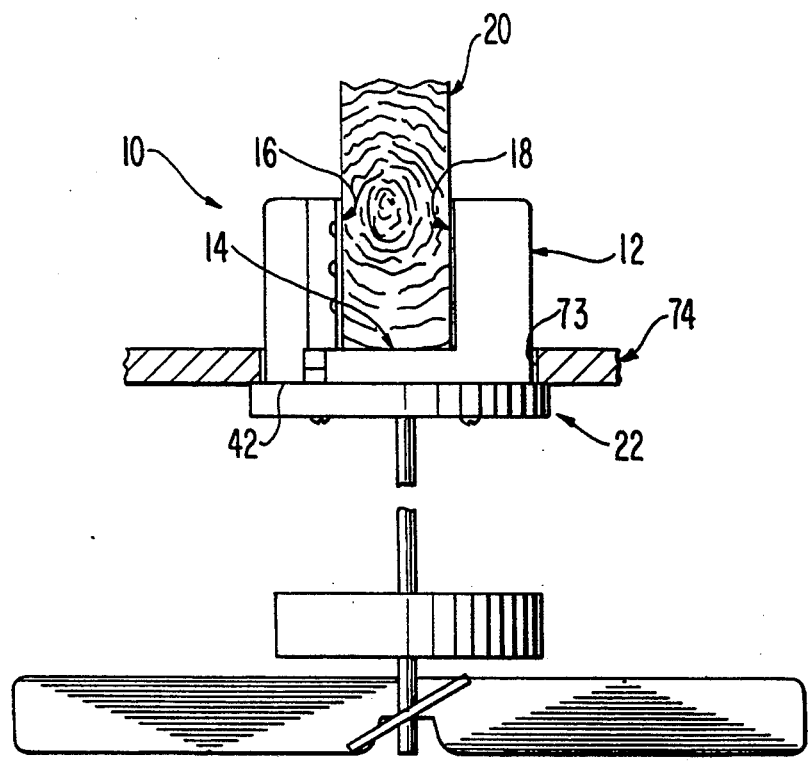
FIG. 1 is an end elevational view of a ceiling box of the present invention mounted to a structural member, such as a ceiling joist, and having a ceiling fan mounted thereto.

Referring to FIGS. 1–7, a ceiling box 10 according to a first embodiment of the present invention is illustrated for supporting ceiling fans weighing up to 35 pounds and static ceiling fixtures up to 50 pounds, and comprises a body member 12 having a lower wall 14 and first and second side walls 16 and 18 defining a joist receiving recess 17 for snugly receiving a structural member, such as a ceiling joist 20 therein. The ceiling box 10 further includes first and second mounting holes 54 and 56 for receiving box mounting fasteners 58 and 60 to couple the ceiling box 10 to the joist 20, and first and second openings 62 and 64 for receiving fan supporting fasteners 70 and 72 to couple a ceiling fan 22 to the ceiling box 10.

Preferably, ceiling box 10 is formed as a one-piece, unitary, integrally molded member from a suitable non-metallic material, such as a thermoplastic or thermoset composition, which is preferably substantially rigid, i.e., not readily flexible. Examples of such thermoplastic materials are polyphenylene oxides and polybutylene terephthalate, and an example of such a thermoset material is phenolic resin. Preferably, ceiling box 10 is formed of Valox, which is a polybutylene terephthalate manufactured by General Electric.

Referring now more specifically to the construction of the ceiling box 10, the body member 12 includes a lower wall 14 that is substantially rectangular and planar. The lower wall 14 is coupled to opposed side walls 16 and 18 which extend perpendicularly upward from the lower wall 14 and are substantially planar and parallel to each other. The lower wall 14 and side walls 16 and 18 define the joist receiving recess 17, which is substantially rectangular in cross section. Preferably, joist receiving recess 17 is sized to snugly receive a ceiling joist 20 therein to maintain intimate contact between the ceiling box 10 and the ceiling joist 20. Accordingly, when the ceiling box 10 is fit around a ceiling joist 20, the ceiling box 10 will not rotate, slide or rock back and forth. It will be readily understood by those skilled in the art that the ceiling box 10 can be constructed specifically to fit a specific size of ceiling joist. This invention can also be adapted to fit ceiling joists that are not rectangular in cross section by shaping the lower wall and side walls accordingly.

The body member 12 further includes an outer wall structure formed by first and second outer walls 24 and 26, first and second end walls 28 and 30, and first and second top walls 32 and 34. The first and second top walls 32 and 34 are planar and extend outwardly from the first and second side walls 16 and 18, respectively. The first and second outer walls 24 and 26 are partially planar and partially curved and extend downwardly from the top walls 32 and 34, respectively, and are each coupled to the two ends of the first and second side walls 16 and 18, respectively.

The first side wall 16, first top wall 32 and first outer wall 24 form an enclosed first lobe or cavity 36 of the body member 12. Second side wall 18, second top wall 34 and second outer wall 26 form an enclosed second lobe or cavity 38 of the body member 12. In combination with the space defined below the lower wall 14, the first and second lobes 36 and 38 define a substantially U-shaped inner cavity in the body member 12.

Each of the side walls 24 and 26 may have one or more break out windows 40 which can be selectively broken off to create openings for connecting fittings to sidewalls 24 and 26 which in turn secure a cable, conduit or tubing thereto. The electrical wires are then fed either directly through the cable fitting, or through the conduit or tube, and then fed through the fitting into the first lobe 36 or second lobe 38 of the body member 12 for connection with the internal wiring of a ceiling fan 22.

The first and second end walls 28 and 30 are curved and extend downward from opposite ends of the lower wall 14 and connect opposite ends of the outer walls 24 and 26. The end walls 28 and 30 and outer walls 24 and 26 form a continuous bottom edge 42 defining an open bottom end 44. Preferably, bottom edge 42 lies in a plane substantially parallel to the lower wall 14 and spaced approximately 0.5 inch from the lower wall 14 for mounting flush with 0.5 inch plasterboard 74.

It will probably be readily understood by those skilled in the art that while the outer shape of the body member 12 has been described in terms of first and second outer walls, first and second end walls, and first and second top walls, the body member 12 surrounding the lower wall 14 and side walls 16 and 18 and the joist receiving recess 17 may have any suitable outer shape, including round or polygonal, for enclosing a space for receiving electrical wires.

The ceiling box 10 may be provided with integrally molded features such as clamping members (not shown) for gripping an electrical cable as described in either U.S. Pat. Nos. 4,874,905 to Schnell et al or 4,605,816 to Jorgensen et al, which are both incorporated herein by reference.

Figure 2:
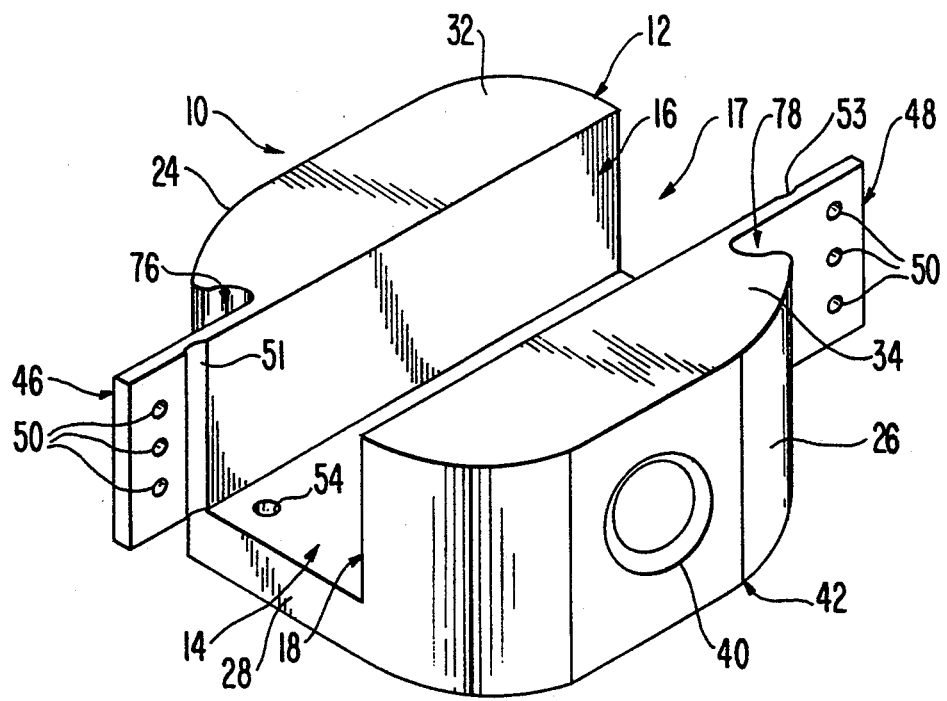
FIG. 2 is a right perspective view of the ceiling box shown in FIG. 1.
Figure 3:
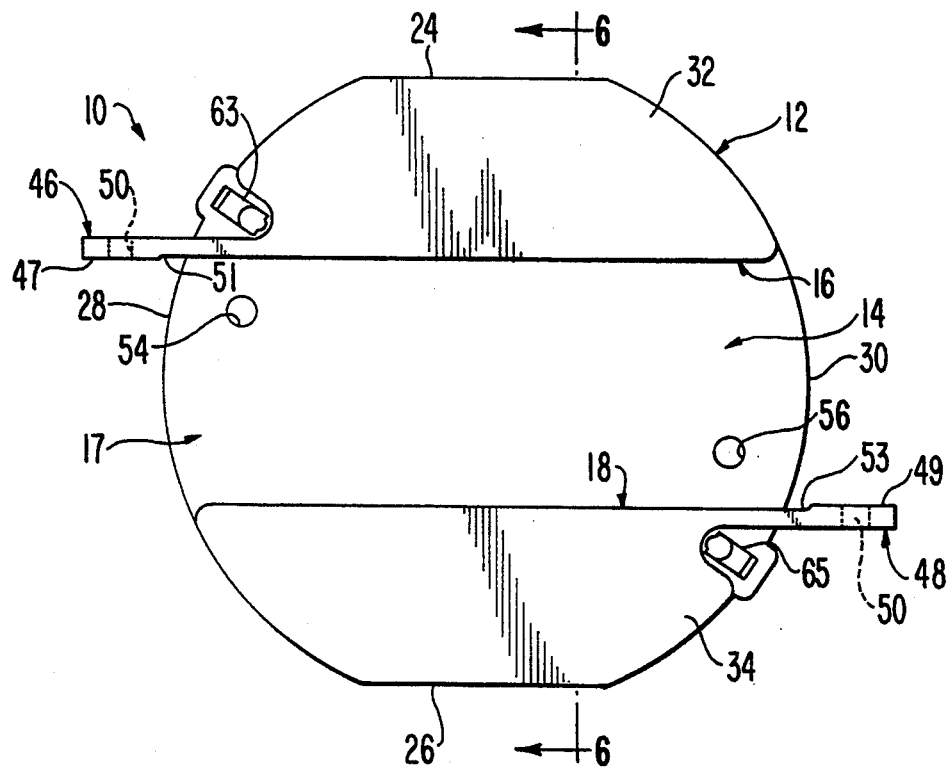
FIG. 3 is a top plan view of the ceiling box shown in FIG. 1.

As seen in FIGS. 2 and 3, the body member 12 also includes first and second brackets 46 and 48 being coupled to and extending outwardly from body member 12 in opposite directions. The first and second brackets are substantially planar and lie in substantially parallel planes. The first bracket 46 extends from the first side wall 16 to form a first substantially planar surface with first side wall 16 for contacting one side of the ceiling joist 20, while the second bracket 48 extends from the second side wall 18 to form a second substantially planar surface with second side wall 18 for contacting the other side of the ceiling joist 20.

As seen in FIG. 3, the inner surfaces 47 and 49 of first and second brackets 46 and 48 are preferably spaced slightly inwardly from the inner surfaces of first and second side walls 16 and 18, respectively, to insure intimate or firm contact with ceiling joist 20. Also, first and second brackets 46 and 48 are each provided with a reduced portion 51 and 53, respectively, adjacent to side walls 16 and 18, respectively. Reduced portions 51 and 53 extend substantially transverse to first and second brackets 46 and 48 to permit the brackets 46 and 48 to flex outwardly upon engaging ceiling joist 20. The brackets 46 and 48 serve as extensions to the side walls 16 and 18 to provide a greater surface area for contacting the ceiling joist 20, thereby imparting greater stability and greater resistance to flexing of the ceiling box 10. The brackets 46 and 48 may also include a series of apertures 50 for receiving bracket screws 52 to allow the brackets 46 and 48 to be attached to a ceiling joist 20.

Figure 7:
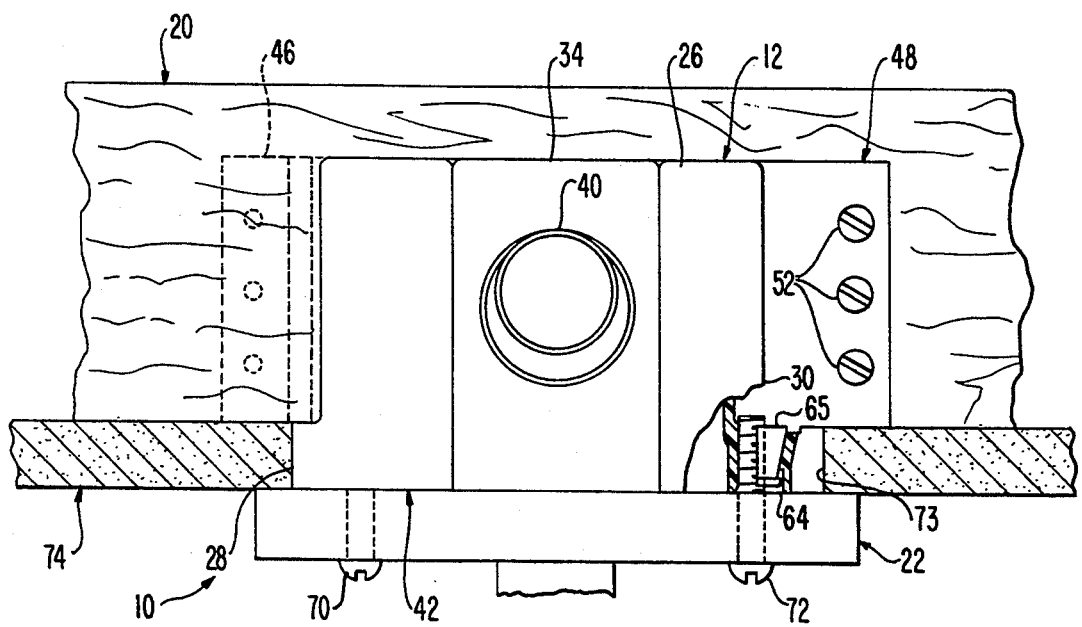
FIG. 7 is a side elevational view of the ceiling box mounted to a joist and a fixture mounted to the box.

The brackets 46 and 48 are preferably on opposite sides and ends of the ceiling box 10 facing opposite sides of the ceiling joist 20 and adjacent opposite corners of the lower wall 14 to provide the maximum resistance to torque loads created by the fan. Preferably, as shown in FIG. 7, the brackets 46 and 48 are spaced upwardly from the bottom edge 42 to allow the bottom end 44 of the ceiling box 10 to extend through opening 73 in plasterboard 74 for mounting the ceiling box 10 flush therewith.

Figure 4:
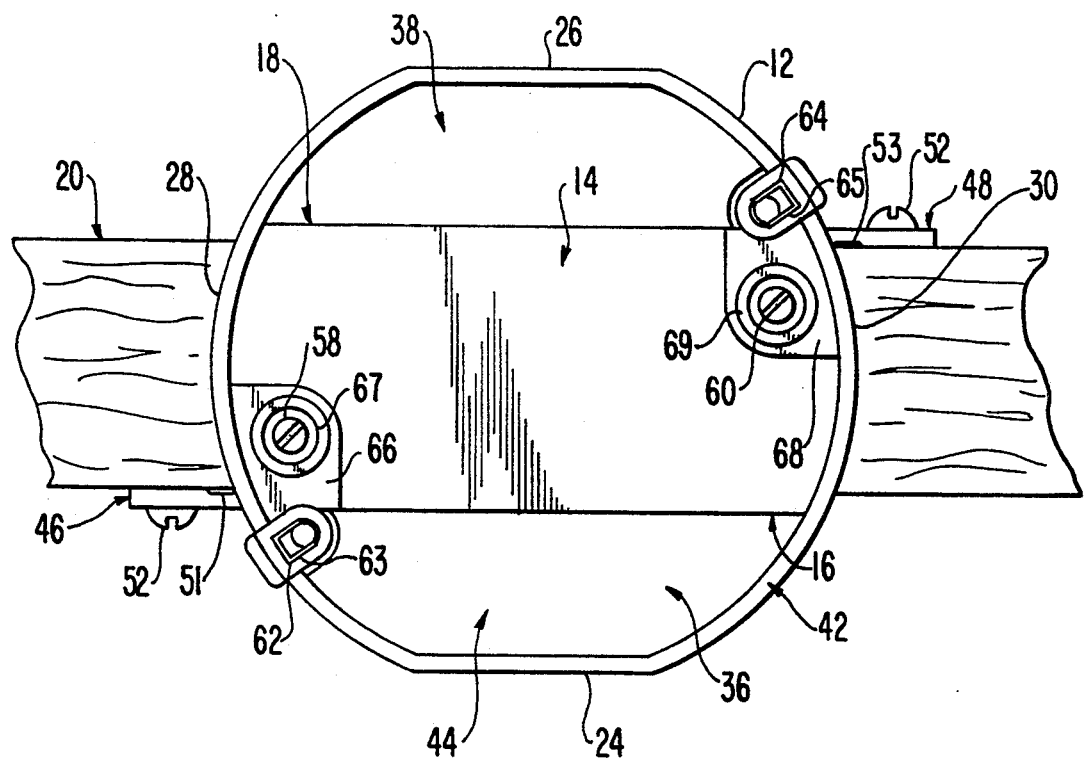
FIG. 4 is a bottom plan view of the ceiling box mounted to a joist and showing the mounting holes for mounting a ceiling fan.
Figure 5:
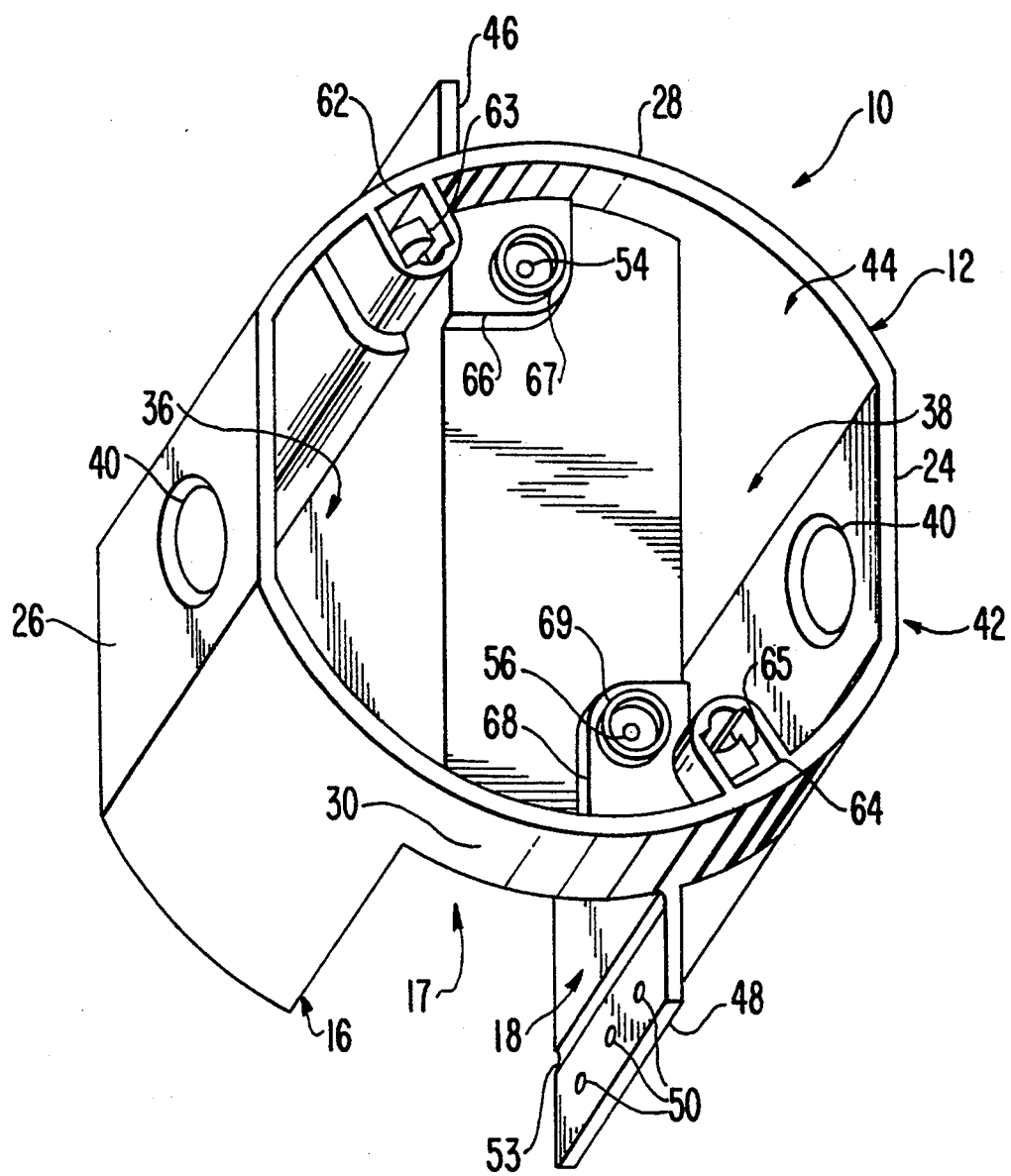
FIG. 5 is a bottom perspective view of the ceiling box shown in FIG. 1.
Figure 6:
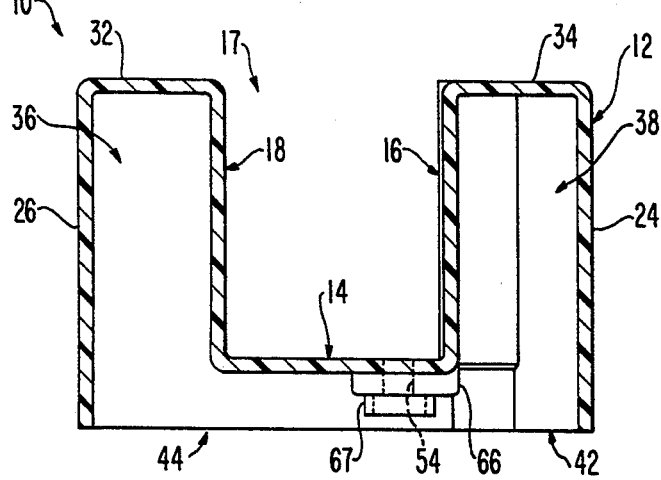
FIG. 6 is an end elevational view in cross section of the ceiling box taken along line 6—6 of FIG. 3.

Referring now to FIGS. 3 and 4, the ceiling box 10 of the present invention further includes first and second box mounting holes 54 and 56 for receiving box mounting screws 58 and 60. Preferably, the box mounting holes 54 and 56 are located in the opposite corners at opposite sides and ends of the lower wall 14 and oriented to allow box mounting screws 58 and 60 to be inserted from the underside of the lower wall 14 to screw into a joist 20, thereby mounting the ceiling box 10 to the joist 20. Placing the box mounting holes 54 and 56 at opposite corners of the lower wall 14 allows increased stability for handling torque loads. The lower wall 14 includes reinforced portions 66 and 68 around box mounting holes 54 and 56 for increased strength.

Upstanding cylindrical walls 67 and 69 surround the box mounting holes 54 and 56 for additional strength and to insulate the box mounting screws 58 and 60 from the electrical wiring (not shown) of the fan.

The ceiling box 10 further includes first and second openings 62 and 64 for threadedly engaging fan supporting screws 70 and 72. Preferably, the openings 62 and 64 are formed to receive plastic inserts or cam members 63 and 65 such as described in U.S. Pat. Nos. 4,843,189 to Jorgensen et al, or described in 4,315,100 to Haslbeck et al, the disclosures of which are both hereby incorporated by reference. The inserts or cam members 63 and 65 can also be similar to those described in co-pending U.S. application Ser. No. 07/311,334, filed Feb. 15, 1989. Of course, instead of using cam member 63 and 65, conventional threaded mounting openings or holes may be used for threadedly engaging fan support screws 70 and 72, or unthreaded mounting holes and special thread cutting screws may be used.

The openings 62 and 64 extend inward from the bottom edge 42 to receive fan supporting screws 70 and 72. The body member 12 includes first and second channels 76 and 78 formed in the outer walls 24 and 26 and which extend upwardly from openings 62 and 64 for inserting cam members 63 and 65 into openings 62 and 64 for inserting cam members 63 and 65 into openings 62 and 64, respectively, and for accommodating longer fan supporting screws. For strength, rigidity and resistance to torque loads, the openings 62 and 64 should be located opposite each other and adjacent the opposite corners of the lower wall 14, adjacent the box mounting screw holes 54 and 56, and adjacent brackets 46 and 48.

As particularly seen in FIGS. 1 and 7, ceiling box 10 is constructed for use in either new construction or old work applications, i.e., an existing opening 73 formed in the ceiling plasterboard and centered below the ceiling joist 20, due to the positioning of first and second box mounting holes 54 and 56 extending through lower wall 14. However, in old work applications, the ceiling box 10 is limited to openings which are centered below a structural member so that ceiling box 10 can straddle the structural member. In either case, it is usually desirable that the ceiling box 10 is mounted on a joist 20 with its bottom edge 42 lying flush with the outer surface of the ceiling plasterboard 74. This is accomplished by the ceiling box 10 of the present invention by spacing lower wall 14 about one-half inch above bottom edge 42 of ceiling box 10 for one-half inch thick ceiling plasterboard.

FIGS. 1 and 7 illustrate a typical installation of the ceiling box 10 mounted on a ceiling joist 20 with the bottom of the ceiling box extending through an opening 73 in ceiling plasterboard 74 so that the bottom edge 42 of the ceiling box 10 is flush with the outer surface of the plasterboard 74.

In new work applications, ceiling box 10 can be easily secured to a ceiling joist 30 for securely supporting a ceiling fan 22 as follows. The body member 12 is placed in a straddling position around a ceiling joist 20 with the lower wall 14, first side wall 16 and second side wall 18 snugly contacting the ceiling joist 20. First and second box mounting screws 58 and 60 are then inserted through first and second box mounting screw holes 54 and 56, and threaded into the ceiling joist 20 for securing the body member 12 to the ceiling joist 20. The ceiling box 10 can be further secured to ceiling joist 20 by first and second brackets 46 and 48, which are fastened to the joist 20 by threading bracket screws 52 into the ceiling joist 20. If not already removed, knock-out hole 40 can be removed as appropriate to prepare for the insertion of electrical wires. Next, the electrical wires of the ceiling fan 22 are coupled to the electrical wires in the ceiling box 10. Fan 22 is now coupled to the ceiling box 10 via fan supporting screws 70 and 72 which are inserted through the fan housing or mounting bracket holes (not shown) to threadedly engage the first and second openings 62 and 64. The weight of the ceiling fan 22 is now supported from the ceiling box 10 by fan supporting screws 70 and 72.

In old work applications, ceiling box 10 is installed in substantially the same manner as discussed above for new work applications, except that brackets 46 and 48 are preferably sawed off along reduced portions 51 and 52 so that ceiling box 10 can be inserted into a four inch diameter hole cut into the plasterboard and centered over the joist or support member 20. If no hole exists in the plasterboard which is centered over a joist or support member, then a stud finder can be used to locate the joist for cutting a four inch diameter hole centered over the joist or support member. Wiring can be fished over from another fixture and the ceiling box 10 secured to the joist or support member 20 by mounting screws 58 and 60.

When the blades of the ceiling fan 22 rotate during operation of the fan, any twisting or torquing force resulting therefrom is transmitted through the fan supporting screws 70 and 72 to the ceiling box 10. Due to the location of the openings 62 and 64 adjacent the side walls 16 and 18, box mounting screws 58 and 60, and brackets 46 and 48 allows maximum rigidity and strength to resist the bending and flexing forces generated by the fan 22.

Ceiling Box Assembly 100

Referring now to FIGS. 8–11, a ceiling box assembly 100 in accordance with a second embodiment illustrated, and includes a ceiling box 110, a substantially U-shaped metal bracket 111, and a pair of box mounting screws 158 and 160. Ceiling box assembly 100 can be used to support ceiling fans weighing over 35 pounds, as well as ceiling fixtures over 50 pounds.

Ceiling box 110 is substantially identical to ceiling box 10 discussed above, and thus only the differences between ceiling box 110 and ceiling box 10 will be discussed and illustrated herein.

Ceiling box 110 comprises a body member 112 having a lower wall 114, a first side wall 116 coupled to lower wall 114 and extending substantially perpendicularly thereto, a second side wall 118 coupled to lower wall 114 and extending substantially perpendicularly thereto, and an outer wall structure 119 coupled to walls 114, 116 and 118. Lower wall 114 together with side walls 116 and 118 define a joist receiving recess 117 for snugly receiving a structural member such as a ceiling joist 120, therein.

Figure 8:
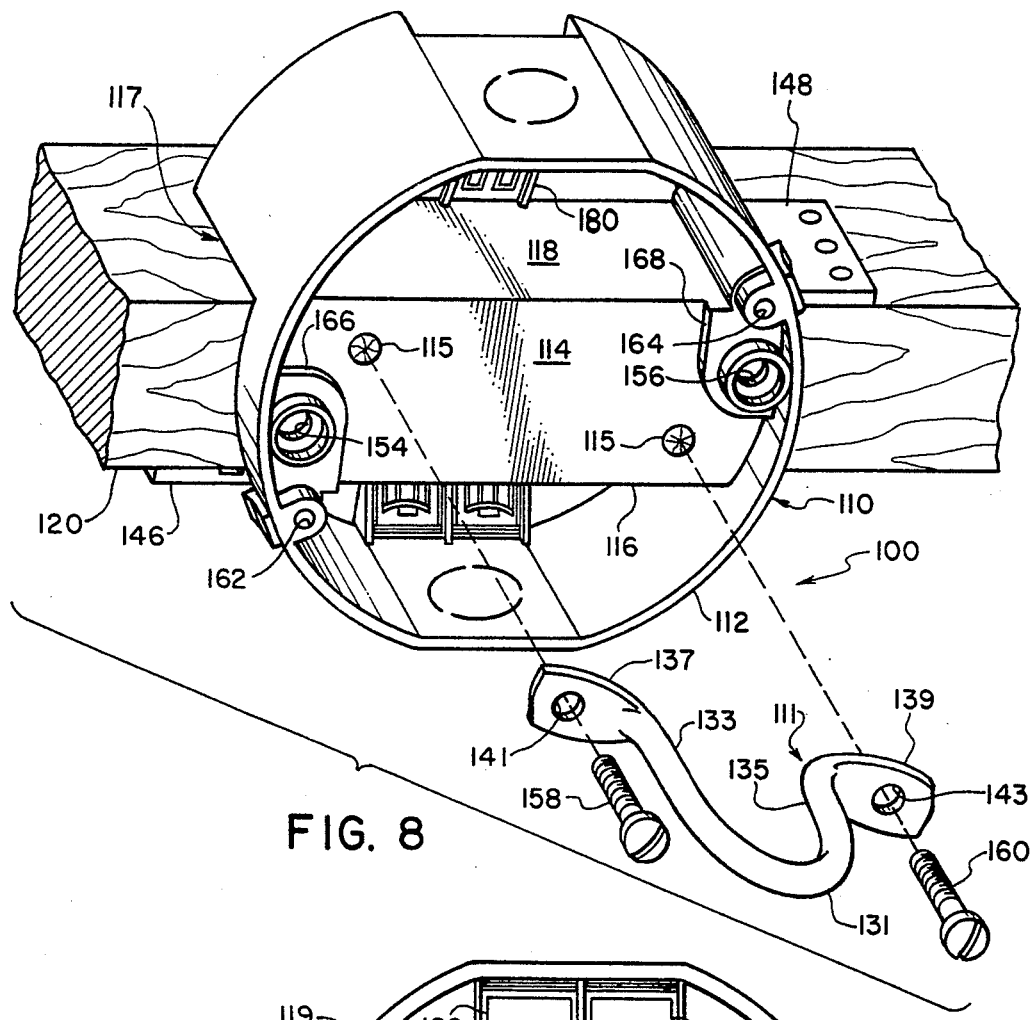
FIG. 8 is an exploded, bottom perspective view of a plastic ceiling box assembly in accordance with a second embodiment of the present invention.

Referring to FIG. 8, lower wall 114 of ceiling box 110 of the present invention, includes first and second box mounting holes 154 and 156 for receiving box mounting screws 158 and 160. Alternatively, screws 158 and 160 are used to mount ceiling box 110 to joist 120 via mounting a bracket 111 as discussed below. Preferably, the box mounting holes 154 and 156 are located in the opposite corners at opposite sides and ends of the lower wall 114 and oriented to allow box mounting screws 158 and 160 to be inserted from the underside of the lower wall 114 to screw into a joist 120 for mounting the ceiling box 110 to the joist 120. Placing the box mounting holes 158 and 160 at opposite corners of the lower wall 114 allows increased stability for handling torque loads. The lower wall 114 includes reinforced portions 166 and 168 around box mounting holes 154 and 156 for increased strength, and a pair of dimples or indentations 115 for drilling holes to attach U-shaped bracket 111 to joist 120 via screws 158 and 160.

The ceiling box 110 further includes first and second openings 162 and 164 for threadedly engaging fan supporting screws 70 and 72 for mounting a ceiling fixture thereto in the same manner as seen in FIG. 7. Preferably, the openings 162 and 164 are cylindrical bores which are threaded, i.e. tapped, upon threading the fan support screws.

Figure 9:
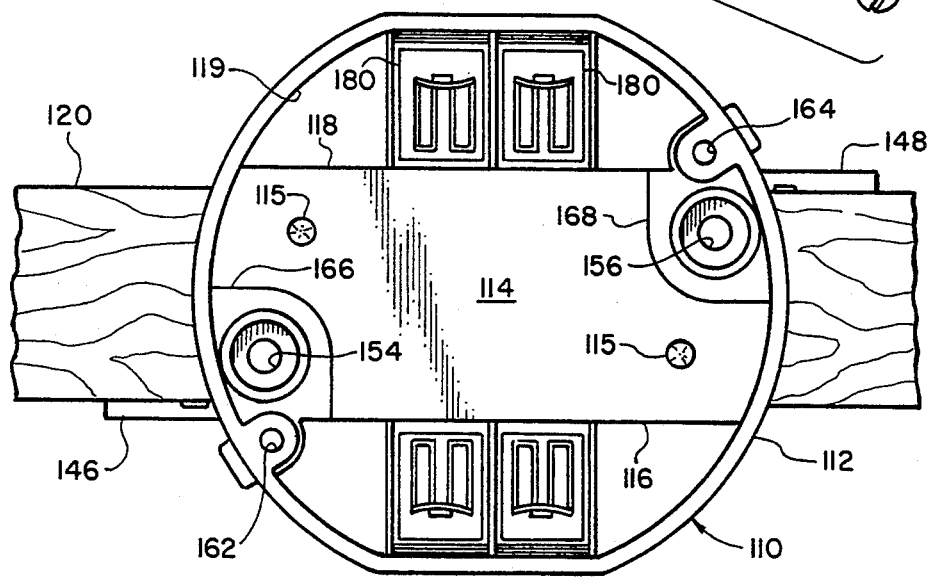
FIG. 9 is a bottom plan view of the plastic ceiling box assembly of FIG. 8 mounted on a joist and without the U-shaped mounting bracket coupled thereto.
Figure 10:
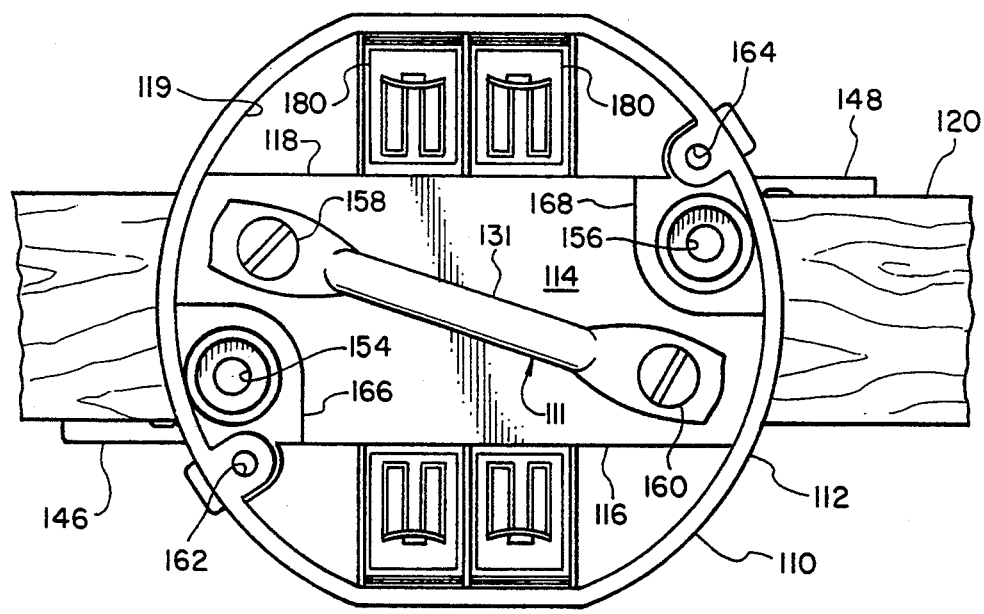
FIG. 10 is a bottom plan view of the plastic ceiling box assembly of FIGS. 8 and 9 coupled to a joist with the U-shaped mounting bracket coupled thereto.

As seen in FIGS. 8–10, the body member 112 also includes first and second brackets 146 and 148 being coupled to and extending outwardly from body member 112 in opposite directions. The first and second brackets are substantially planar and lie in substantially parallel planes. The first bracket 146 extends from the first side wall 116 to form a first substantially planar surface with first side wall 116 for contacting one side of the ceiling joist 120, while the second bracket 148 extends from the second side wall 118 to form a second substantially planar surface with second side wall 118 for contacting the other side of the ceiling joist 120.

The ceiling box 110 may be provided with integrally molded features such as clamping members 180 for gripping an electrical cable as described in either U.S. Pat. Nos. 4,874,905 to Schnell et al or 4,605,816 to Jorgensen et al, which are both incorporated herein by reference.

Figure 11:
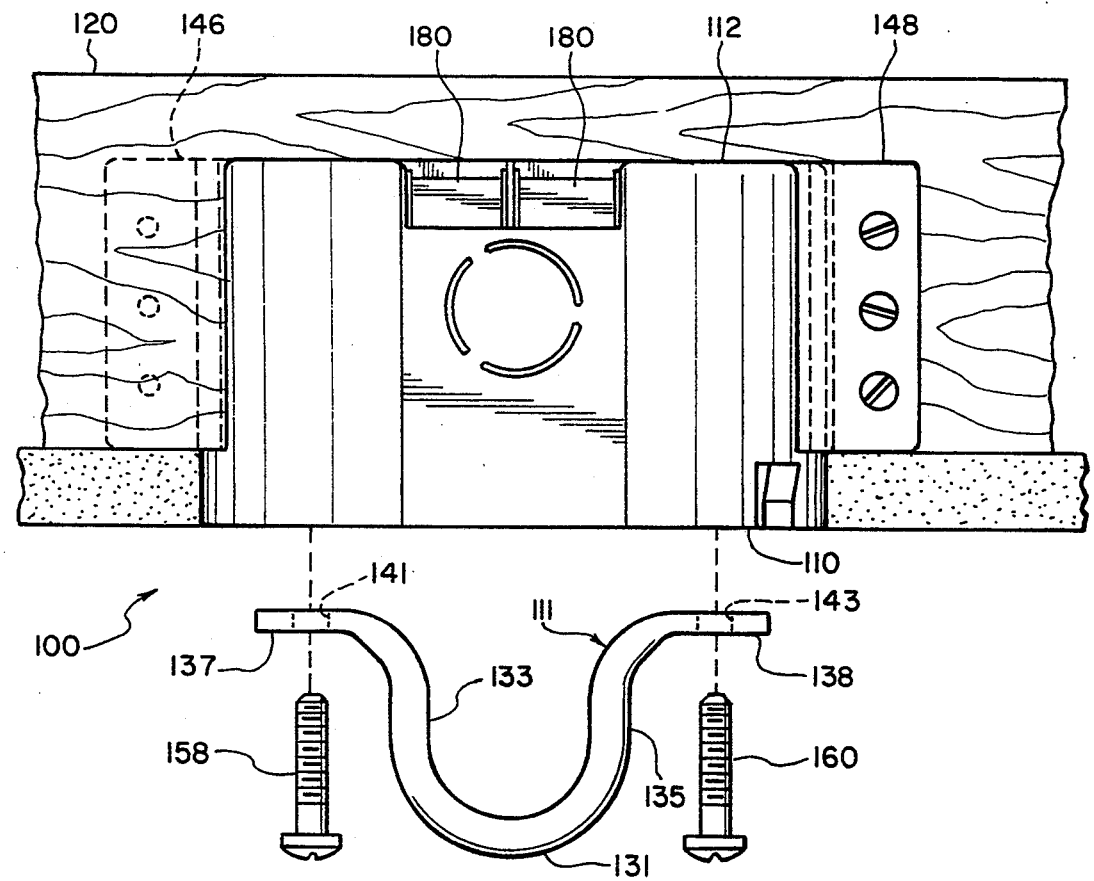
FIG. 11 is an exploded side elevational view of the ceiling box assembly of FIGS. 8–10.

As seen in FIGS. 8 and 11, metal, U-shaped bracket 111 includes a bight portion 131, a first leg portion 133 extending from one end of bight portion 131, and a second leg portion 135 extending from the other end of bight portion 131. First and second leg portions 133 and 135 have mounting flanges 137 and 139, respectively. Flanges 137 and 139 extend perpendicularly, outwardly from leg portions 133 and 135 for mounting metal bracket 111 to ceiling box 110 and ceiling joist 120. In particular, mounting flanges 137 and 139 have mounting holes 141 and 143 for receiving box mounting fasteners 158 and 160 therein, respectively.

When using ceiling box 110 for supporting ceiling fans weighing up to 35 pounds, or fixtures weighing up to 50 pounds, box mounting fasteners 158 and 160 are inserted through mounting holes 154 and 156 of ceiling box 110 and threaded into ceiling joist 120 for coupling ceiling box 110 to ceiling joist 120 in the same manner as discussed above pertaining to ceiling box 10. Accordingly, U-shaped bracket 111 is unnecessary and may be discarded.

When ceiling box 110 is used to support ceiling fans weighing over 35 pounds, or fixtures weighing over 50 pounds, then dimples 115 are drilled out to form holes for receiving box mounting fasteners 158 and 160 therein. Ceiling box 110 and U-shaped bracket 111 then can be coupled to ceiling joist 120! by box mounting fasteners 158 and 160. Accordingly, the ceiling fan is supported directly on ceiling joist 120 by U-shaped bracket 111 and fasteners 158 and 160. In other words, when U-shaped bracket 111 is used, ceiling box 110 does not provide the sole support for the ceiling fan since bracket 111 is coupled directly to ceiling joist 120 via mounting fasteners 158 and 160.

Although the invention has been described with respect to a ceiling box and an embodiment for mounting a ceiling fan to a ceiling, the ceiling boxes 10 and 110 can be used to mount other electrical fixtures, such as, e.g., overhead lights. Also, the ceiling boxes 10 and 110 can be used to mount such fixtures to the walls or other surfaces of a building that contain a support member, i.e., stud, that can be straddled by the box.

While only two embodiments have been chosen to illustrate the invention, it will be understood by those skilled in the art that various changes and modifications can be made herein without departing from the scope of the invention as defined in the appended claims.

What is claimed is:

1. A ceiling box assembly adapted to support a ceiling fan thereon and adapted to be mounted on a structural member, the combination comprising:
    a substantially planar lower wall;
    first and second substantially planar opposed side walls coupled to and substantially perpendicular to said lower wall for defining a recess sized to snugly receive a structural member therein;
    an outer wall structure coupled to said first and second side walls and said lower wall for defining a substantially U-shaped shaped inner cavity with a continuous bottom edge defining an open bottom;
    a first bracket being coupled to said outer wall structure to form a first substantially planar surface with said first side wall for contacting one side of the structural member;
    a second bracket being coupled to said outer wall structure to form a second substantially planar surface with said second side wall for contacting the other side of the structural member; and
    fastening means, coupled to said outer wall structure at said bottom edge, for coupling the ceiling fan thereto,
    said lower wall, said side walls, said outer wall and said brackets all being formed of substantially rigid plastic.

2. A ceiling box assembly according to claim 1, wherein
    said lower wall, said side walls, said outer wall and said brackets of said ceiling box are formed as a one-piece, unitary, integrally molded member.

3. A ceiling box assembly according to claim 2, wherein
    a pair of mounting holes extending through said lower wall for receiving a mounting fastener in each of said mounting holes.

4. A ceiling box assembly according to claim 3, wherein
    said lower wall is substantially rectangular with one of said mounting holes located adjacent a first corner of said lower wall, and the other of said mounting holes located in a second corner of said lower wall opposite to said first corner.

5. A ceiling box assembly according to claim 4, wherein
    said fastening means includes a pair of openings for threadedly receiving a pair of fan supporting fasteners therein.

6. A ceiling box assembly according to claim 5, wherein
    one of said openings is located adjacent one of said mounting holes, and the other of said openings is located adjacent the other of said mounting holes.

7. A ceiling box assembly according to claim 5, wherein
    said fastening means is directly coupled to said outer wall structure.

8. A ceiling box assembly according to claim 3, further comprising
    a substantially U-shaped metal bracket coupled to the ceiling box and for supporting the fan, said bracket having a bight portion, a first leg portion extending from one end of said bight portion, and a second leg portion extending from the other end of said bight portion, and each of said first and second leg portions having a mounting hole for receiving one of said mounting fasteners therein.

9. A ceiling box assembly adapted to support a ceiling fixture thereon and adapted to be mounted on a structural member, the combination comprising:
    a ceiling box with a body member having an outer wall structure forming a U-shaped inner cavity, said outer wall structure having a substantially planar lower wall with an interior surface, a first substantially planar side wall extending substantially perpendicular to said lower wall, and a second substantially planar side wall extending substantially perpendicular to said lower wall for defining an exterior recess for receiving the structural member therein, said body member being integrally formed of substantially rigid plastic;
    a substantially U-shaped metal bracket coupled to said ceiling box and for supporting the fixture, said bracket having a bight portion, a first leg portion extending from one end of said bight portion, and a second leg portion extending from the other end of said bight portion, each of said first and second leg portions having mounting means for receiving first and second box mounting fasteners, respectively;
    first means, formed in said lower wall, for receiving said first box mounting fastener to couple said first leg portion of said bracket to said interior surface of said lower wall and to couple said lower wall to the structural member received in said recess of said body member;
    second means, formed in said lower wall, for receiving said second box mounting fastener to couple said second leg portion of said bracket to said interior surface of said lower wall and to further couple said lower wall to the structural member received in said recess of said body member, said first and second means being located at opposite ends of said lower wall;
    third means, formed in said body member, for receiving a first fan supporting fastener to couple a ceiling fixture to said body member; and
    fourth means, formed in said body member, for receiving a second fan supporting fastener to couple a ceiling fixture to said body member.

10. A ceiling box assembly according to claim 9, wherein
said third means includes a first opening located adjacent said first means to receive the first fan supporting fastener therein and said fourth means includes a second opening located adjacent said second means to receive the second fan supporting fastener therein.

11. The ceiling box assembly according to claim 9, wherein
said recess is sized to snugly receive the structural member and to allow intimate contact of said lower wall and said first and second side walls with the structural member to prevent rocking and rotation movements of said body member when a structural member is received in said recess.

12. A ceiling box assembly according to claim 9, wherein
said first and second means include first and second screw holes, respectively, in said lower wall for receiving said first and second box mounting fasteners therethrough into said recess.

13. A ceiling box assembly according to claim 9, wherein said body member further comprises:
a first bracket coupled to said body member adjacent said first means and said third means and to form a first substantially planar surface with said first side wall for contacting the structural member; and
a second bracket coupled to said body member adjacent said second means and said fourth means and to form a second substantially planar surface with said second side wall for contacting the structural member.

14. A ceiling box assembly according to claim 13, and further comprising
fifth means formed in said first bracket for receiving at least one first bracket fastener and sixth means formed in said second bracket for receiving at least one second bracket fastener.

* * * * *